(12) United States Patent
Ekola

(10) Patent No.: US 9,321,605 B2
(45) Date of Patent: Apr. 26, 2016

(54) WEB TENSION BRAKE ANTI-SQUEAL IMPROVEMENT

(75) Inventor: Kenneth Ekola, Dover, NH (US)

(73) Assignee: DOVER FLEXO ELETRONICS, INC., Rochester, NH (US)

(*) Notice: Subject to any disclaimer, the term of this patent is extended or adjusted under 35 U.S.C. 154(b) by 386 days.

(21) Appl. No.: 13/353,403

(22) Filed: Jan. 19, 2012

(65) Prior Publication Data

US 2012/0181368 A1 Jul. 19, 2012

Related U.S. Application Data

(60) Provisional application No. 61/434,081, filed on Jan. 19, 2011.

(51) Int. Cl.
 *F16D 65/092* (2006.01)
 *B65H 23/06* (2006.01)
 *F16D 55/04* (2006.01)
 *F16D 65/097* (2006.01)
 *F16D 121/04* (2012.01)

(52) U.S. Cl.
 CPC ............... *B65H 23/06* (2013.01); *F16D 55/04* (2013.01); *F16D 65/0971* (2013.01); *B65H 2403/7255* (2013.01); *B65H 2601/521* (2013.01); *F16D 2121/04* (2013.01)

(58) Field of Classification Search
 CPC . F16D 65/0006; F16D 65/092; F16D 65/097; F16D 65/0971; F16D 2055/0091; F16D 55/02; F16D 2121/04; B65H 23/06; B65H 2403/7255; B65H 2601/521; B65H 2601/524
 USPC ........ 188/73.37, 83, 250 E, 251 R, 256, 251 A
 See application file for complete search history.

(56) References Cited

U.S. PATENT DOCUMENTS

| | | | |
|---|---|---|---|
| 3,885,651 A * | 5/1975 | Odier | 188/73.37 |
| 5,052,525 A * | 10/1991 | Ekola | 188/73.32 |
| 6,230,857 B1 | 5/2001 | Ciriello | |
| 2004/0188190 A1 | 9/2004 | Niwa et al. | |
| 2010/0140029 A1 | 6/2010 | Parild et al. | |

* cited by examiner

*Primary Examiner* — Robert A Siconolfi
*Assistant Examiner* — Vu Q Nguyen
(74) *Attorney, Agent, or Firm* — Davis & Bujold PLLC; Michael J. Bujold

(57) ABSTRACT

An apparatus and method for reducing brake squeal in a web tension brake. The apparatus comprising an anti-squeal friction pad assembly having a friction pad mounted on a back plate and a rubber isolation layer sandwiched between the back plate and a second back plate. The rubber isolation layer to dampen vibrations and break up the symmetry of the brake assembly minimizing acoustic resonances that cause the objectionable squeal.

10 Claims, 3 Drawing Sheets

WEB TENSION BRAKE ANTI-SQUEAL IMPROVEMENT

RELATED APPLICATIONS

This application claims the benefit of U.S. Provisional Application No. 61/434,081, filed Jan. 19, 2011. This application is herein incorporated by reference in its entirety for all purposes.

FIELD OF THE INVENTION

The invention relates to a device to substantially reduce or eliminate brake squeal of a brake when applying tension to an industrial continuous material, for example: a paper web, wire, etc. from an unwind stand of an industrial process machine, for example: a printing press, coating machine, etc. and, more particularly, to a friction pad having a multi-layered back plate of differing materials in a sandwiched structure to reduce or eliminate that squeal.

BACKGROUND OF THE INVENTION

In printing press operations a variety of pneumatic brakes have been employed in an unwind stand of the press. Such brakes may be standard dual disc brakes, universal actuator brakes, single disc brakes or pod-style brakes. Typically, these brakes, when used to brake an unwinding roll of paper installed on the unwind stand, generate squeal which adds noise to the surrounding environment making conversation difficult and causing operator discomfort.

Various attempts have been made in the past to reduce brake squeal. These include use of alternative friction materials, spray on formulas and different brake mounting schemes. All have met with limited or no success.

There exists a need for a friction pad assembly that reduces squeal resulting from such brakes in the environment surrounding a printing press or other industrial process machines with unwind capabilities.

SUMMARY OF THE INVENTION

It is an object of the present invention to overcome the aforementioned problems and drawbacks associated with the prior art designs.

One object of the invention is to provide a friction pad assembly that reduces brake squeal in printing press environs and other tension brake (constant slip) applications.

Another object of the invention is to improve safety and reduce fatigue of printing press operators by providing squeal free brake-pads to reduce environmental noise pollution.

Brake squeal is caused by resonant vibrations in the disk brake components which result from the frictional contact that occurs between the brake pad and the brake disk throughout the continuous slip operation of a tensioning brake.

According to an embodiment of the invention, there is provided an anti-squeal friction pad assembly, for an unwind stand tension brake of a printing press, comprising: a friction pad and a multi-layered back plate structure which sandwiches a rubber insulating layer. The rubber insulating layer acts as a damping material which minimizes the resonances that produce the squeal.

Additionally, by installing the anti-squeal friction pad assembly in only one, or a subset, of the total number of friction pad assemblies within the perimeter of the brake disk, the symmetry of the brake pad arrangement is broken up which further contributes to resonant vibration reduction.

The rubber insulating layer may be formulated to withstand the high temperatures that can be generated by the continuous slip operation of the tensioning brake.

One embodiment of the present invention continuously operated web tension brake having: a brake disc; an anti-squeal friction pad assembly comprising a friction pad, a first back plate adhered to the friction pad, an isolation layer adhered to the first back plate and a second back plate adhered to the rubber isolation layer; and a plurality of pneumatically actuated pistons to frictionally engage the anti-squeal friction pad assembly to the brake disk.

Another embodiment of the present invention provides such a brake further comprising a second brake disk and a second plurality of pneumatically actuated pistons to frictionally engage the anti-squeal friction pad assembly to the second brake disk.

A further embodiment of the present invention provides such a brake further comprising a conventional friction pad assembly, said conventional friction pad assembly comprising of a friction pad and back plate.

Still another embodiment of the present invention provides such a brake wherein the isolation layer is formulated to withstand temperatures that occur during continuous brake application.

A still further embodiment of the present invention provides such a brake wherein said rubber layer comprises a high temperature rubber.

Yet another embodiment of the present invention provides such a brake wherein said high temperature rubber is a silicon rubber.

A yet further embodiment of the present invention provides such a brake wherein said isolation layer comprises a soft metal layer.

Even another embodiment of the present invention provides such a brake wherein said soft metal is selected from the group consisting of lead, zinc, aluminum, and alloys thereof.

An even further embodiment of the present invention provides such a brake wherein said isolation layer comprises a thermoplastic layer.

Still yet another embodiment of the present invention provides such a brake wherein said isolation layer comprises leather.

One embodiment of the present invention provides an anti-squeal friction pad assembly, said pad assembly having: a friction pad; a back plate; and an isolation layer disposed between said friction pad and said back plate, said isolation layer being configured to change the natural frequency of vibration of said pad assembly.

Another embodiment of the present invention provides such a pad assembly wherein the isolation layer is formulated to withstand temperatures that occur during continuous brake application.

A further embodiment of the present invention provides such a pad assembly wherein said rubber layer comprises a high temperature rubber.

Still another embodiment of the present invention provides such a pad assembly wherein said high temperature rubber is a silicon rubber.

A still further embodiment of the present invention provides such a pad assembly wherein said isolation layer comprises a soft metal layer.

Yet another embodiment of the present invention provides such a pad assembly wherein said soft metal is selected from the group consisting of lead, zinc, aluminum, and alloys thereof.

A yet further embodiment of the present invention provides such a pad assembly wherein said isolation layer comprises a thermoplastic layer.

Even another embodiment of the present invention provides such a pad assembly wherein said isolation layer comprises leather.

One embodiment of the present invention provides a method for reducing squeal in a web tension brake including providing a brake disc; providing an anti-squeal friction pad assembly comprising a friction pad, a first back plate adhered to the friction pad, a rubber isolation layer adhered to the first back plate and a second back plate adhered to the rubber isolation layer; and pneumatically actuating a plurality of pistons to frictionally engage the anti-squeal friction pad assembly to the brake disk.

Another embodiment of the present invention provides such a method further comprising providing a conventional friction pad assembly comprising a friction pad adhered to a first back plate and pneumatically actuating a plurality of pistons to frictionally engage the conventional friction pad assembly to the brake disk.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
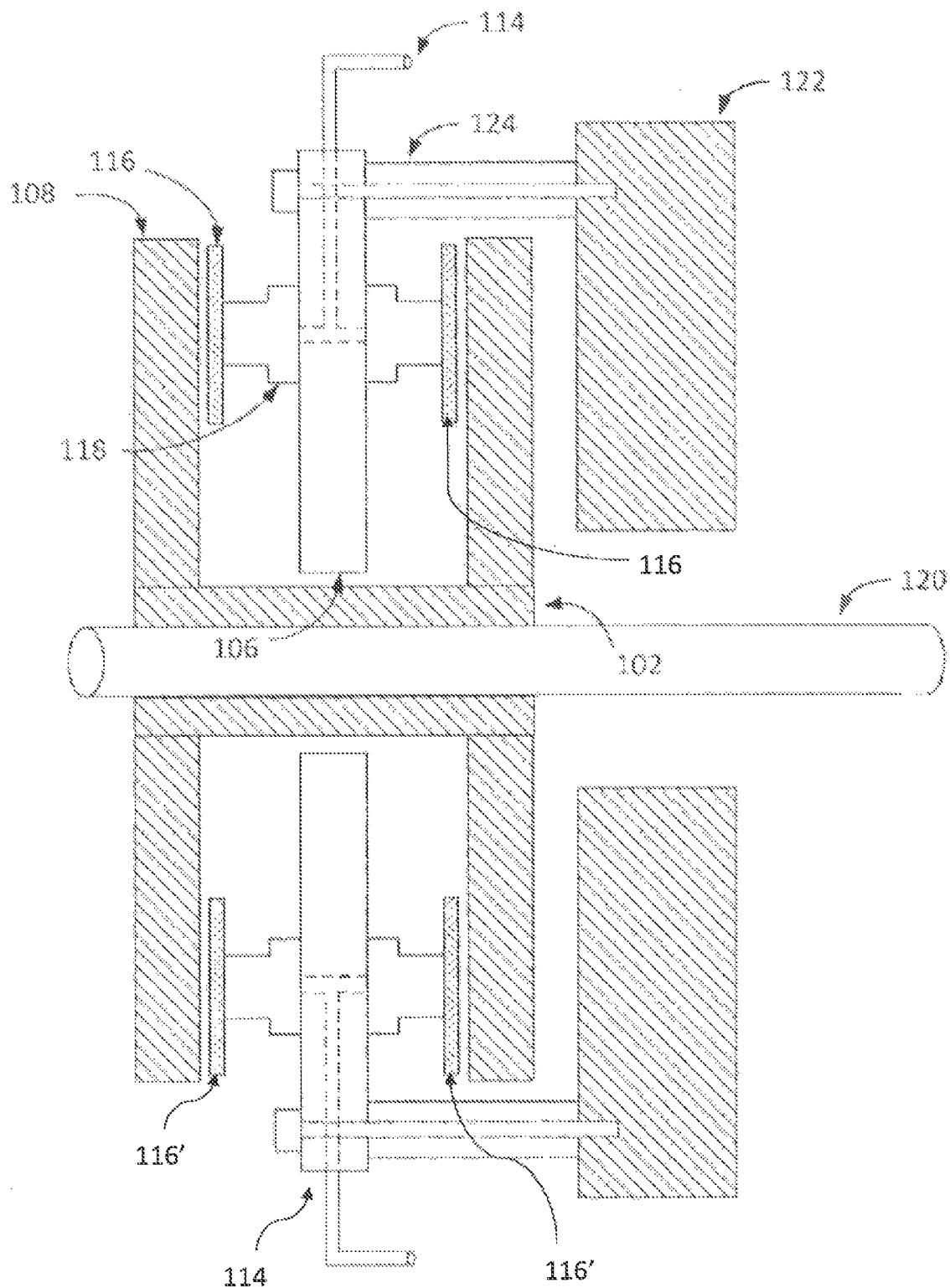
FIG. 1A is a diagrammatic view of a brake assembly incorporated into an unwind stand using the friction pad assembly according to an embodiment of the invention.

The invention is susceptible to many variations. Accordingly, the drawings and following description of various embodiments are to be regarded as illustrative in nature, and not as restrictive.

In industrial unwind applications, rolls of continuous material, i.e., a web or flexible substrate, undergo operations such as printing, coating, laminating, treating, metalizing, and rewinding. Throughout this process the material may need to be held at a particular level of tension. This is accomplished with a braking mechanism attached to the unwind spool. Unlike an automobile brake, which is applied intermittently to slow the vehicle down, the brake in an unwind application is applied continuously to maintain a constant desired level of tension as the material unwinds and moves through the process.

In addition to controlling the unwind speed of a material from a spool, other continuous slip applications include pneumatic clutches to drive a rewind system. Brakes and clutches may also be used to hold back or drive, respectively, a roller located somewhere between the unwind and rewind systems of the industrial machine or process in order to create or control web tension. Many other applications, although less common, can be envisioned. For example, holding back a theater curtain as it is lowered.

Unfortunately the operation of these brakes can result in an unpleasant high pitched squeal noise. The squeal, besides being annoying, can result in operator fatigue and create an unsafe work environment.

Brake squeal is caused by resonant vibrations in the disk brake components which result from the frictional contact that occurs between the brake pad and the brake disk throughout the continuous slip operation of a tensioning brake. After much experimentation it has been determined that the squeal can be reduced or even eliminated by installing a pad having a more effective damping material on the back side and by breaking up the symmetry of the brake, both of which minimize vibrational resonance. These two goals can be achieved by making a special anti-squeal pad in a sandwich structure similar to a conventional pad but with two back plates separated by a thin rubber material. The rubber acts as an isolator, making the pad behave differently from the other conventional pads in the brake.

Referring now to FIG. 1, a diagrammatic view of a brake assembly incorporated into an unwind stand using the friction pad assembly is shown, according to an embodiment of the invention. A stationary machine frame 122 of the unwind stand supports, via bolt and spacer 124, a support plate 106. The plate 106 supports a pneumatic cylinder housing and piston 118 which pushes the friction pad assembly 116 into frictional engagement with a brake disk 108.

A pressurized air supply is provided by port 114 through support plate 106 to operate the pneumatic piston assembly 118 to move the friction pad assembly 116 to engage the rotatable brake disk 108.

The brake disk 108 is connected, via a hub assembly 102, to a rotatable shaft 120 of the unwind stand. The shaft 120 supports a roll of material (not shown) which is to be unwound under tension for whatever operations are required as part of the industrial application. When the friction pad assembly 116 engages the braking disk 108, the shaft 120 of the unwind stand is braked to apply a desired tension to a web of the material in dependence on the pressure derived from the air supply and the resulting friction of the pad engagement with the disk.

FIG. 1 illustrates a dual disk brake scenario where brake disk 108 is duplicated on the right hand side of support plate 106 along with a duplicate pneumatic cylinder housing and piston 118. Duplication of reference numbers on the right hand side has been omitted in the interest of drawing clarity. By providing mirror image piston and brake pad assemblies in this dual disk brake configuration, the total braking torque that can be applied to disks 108 and shaft 120 is effectively doubled.

Brake disks 108 are circular plates that encircle shaft 120. Multiple instances of the piston and brake pad assemblies may be employed circumferentially around the brake disk plates depending on the total braking torque required and the space available. FIG. 1 illustrates a second pair of piston and brake pad assemblies at the bottom of the brake disk. These are identical to the top side versions and once again duplication of reference numbers has been omitted in the interest of drawing clarity.

Figure 2:
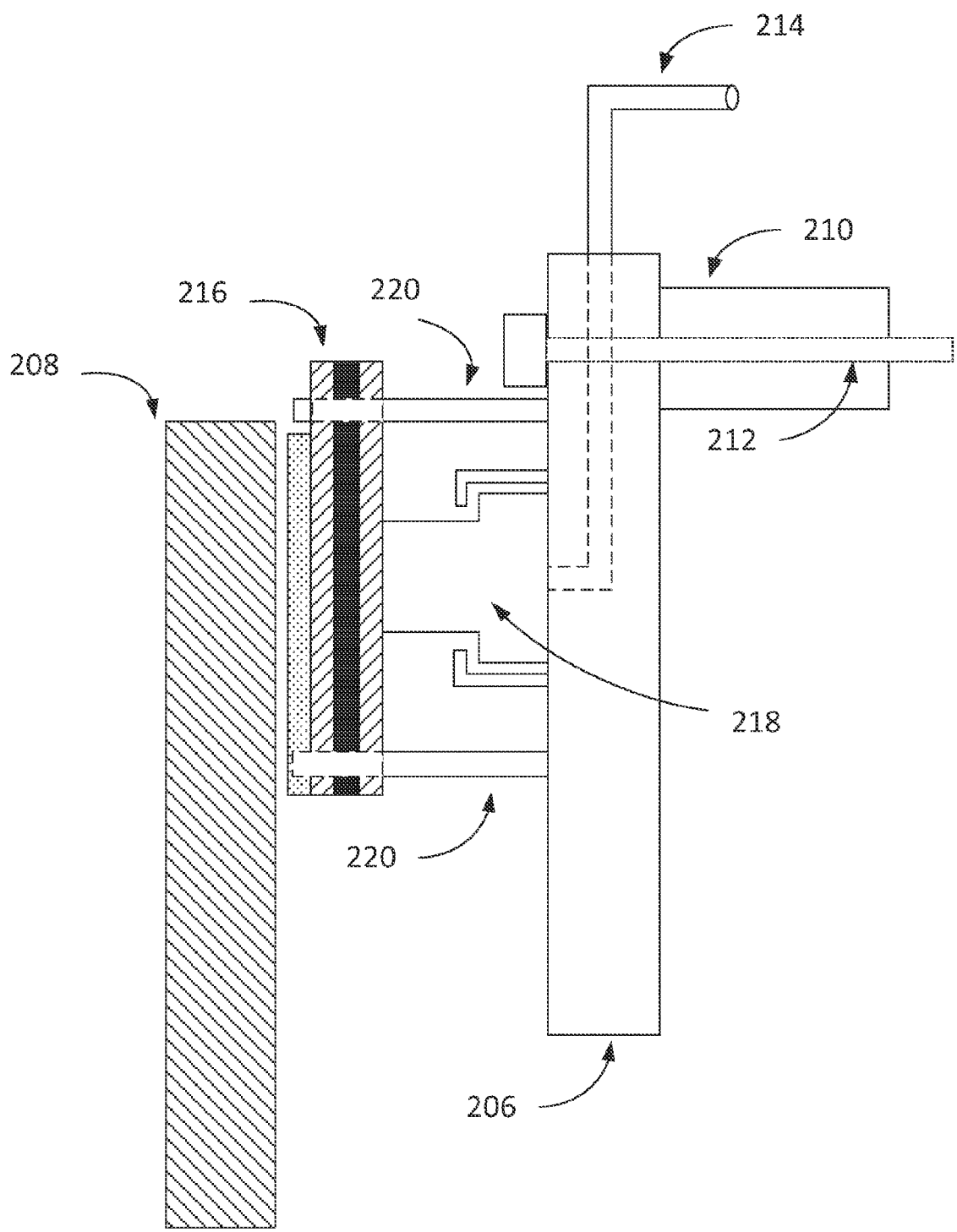
FIG. 2 is a diagrammatic view of the brake assembly of FIG. 1 providing a more detailed view of a single friction pad assembly according to an embodiment of the invention.

Referring now to FIG. 2, a diagrammatic view of the brake assembly of FIG. 1 providing a more detailed view of a single friction pad assembly is shown, according to an embodiment of the invention. Support plate 206 is attached to stationary machine frame 122 of the unwind stand (FIG. 1) via bolt 212 and spacer 210. The plate 206 supports a pneumatic cylinder housing and piston 218. The friction pad assembly 216, restrained by through hole 304 and notch 306 (of FIG. 3 described below), is movable on guide studs 220 into frictional engagement with rotatable brake disk 208.

A pressurized air supply is provided by port 214 through support plate 206 to operate the pneumatic cylinder assembly 218 to move the friction pad assembly 216 to engage the rotatable brake disk 208 with the appropriate force necessary to provide the desired braking torque.

Figure 3:
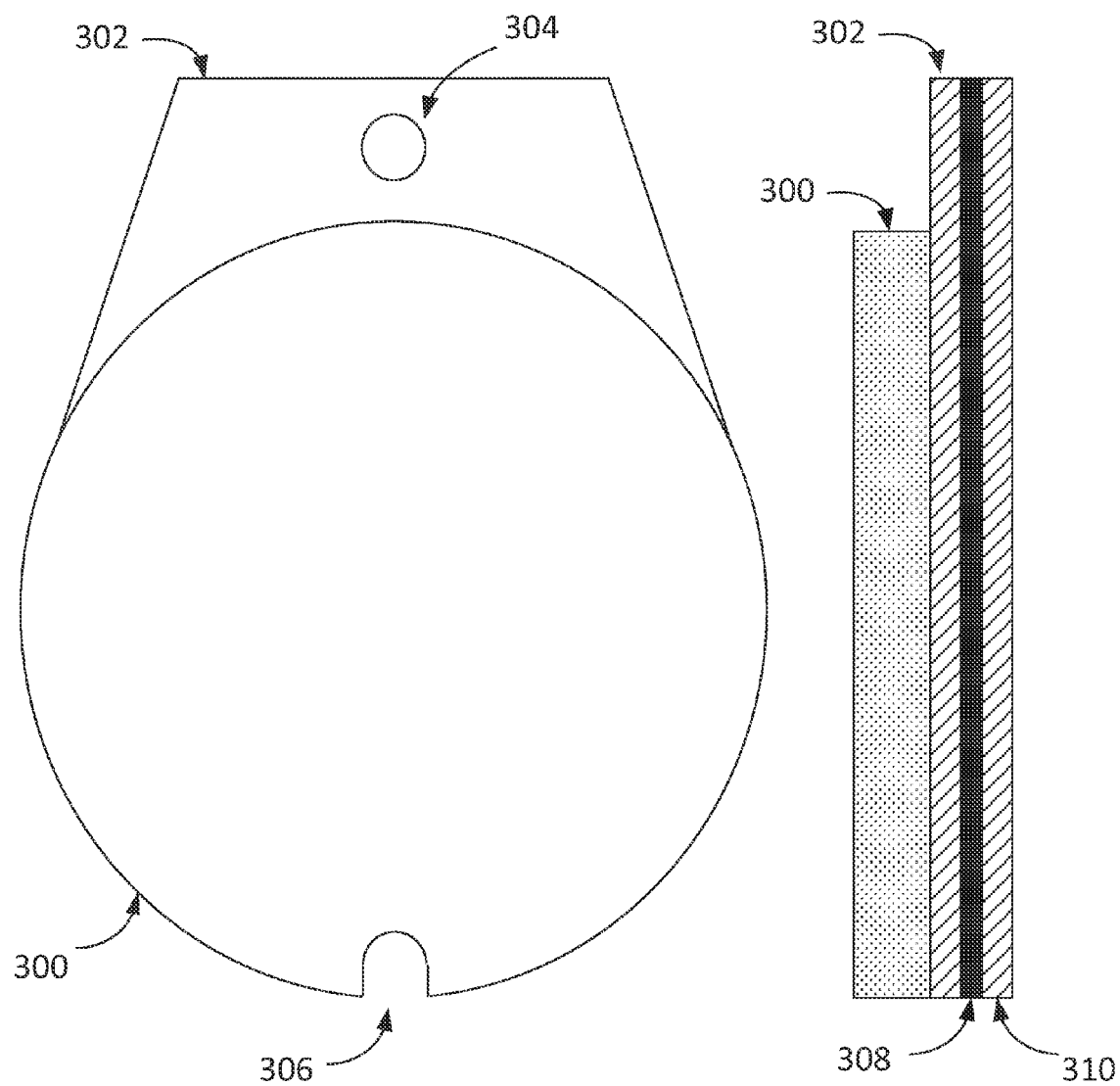
FIG. 3 is a front and side elevation view of a friction pad assembly according to an embodiment of the invention.

Referring now to FIG. 3, a front and side elevation view of an anti-squeal friction pad assembly is shown, according to an embodiment of the invention. A circular friction pad 300 is mounted on a back plate 302. A rubber isolation layer 308 is sandwiched between back plate 302 and a second back plate 310.

The rubber insulating layer may be formulated to withstand the high temperatures that can be generated by the continuous slip operation of the tensioning brake. Other materials may be used to provide isolation including soft metals like lead, aluminum, zinc and their alloys, thermoplastics and other polymers, and even natural materials like leather.

The various layers 300, 302, 308 and 310 may be attached to one another using any suitable method including welding or brazing between the metal surfaces and including epoxy and other adhesives for the rubber isolation layer such that the layers are held fast while maintaining acoustic decoupling.

Through hole 304 and notch 306, which extend through all four layers, are provided for mounting of the friction pad assembly onto the brake mechanism with guide studs 220.

In some embodiments, friction pad 300 has a thickness of about 0.160 to 0.170 inches, back plates 302 and 310 have a thickness of about 0.085 to 0.095 inches and rubber isolation layer 308 has a thickness of about 0.015 to 0.025 inches. Friction pad 300 may have a diameter of about 3.25 inches.

The rubber isolation layer 308 serves to dampen the resonant vibrations caused by the engagement of the friction pad with the continuously rotating brake disk that create the objectionable brake squeal.

The anti-squeal friction pad assembly of FIG. 3 differs from a normal or conventional friction pad assembly in that the conventional version has only a friction pad mounted on a single back plate. As discussed previously, the entire brake assembly will typically consist of several friction pad assemblies 116 and piston assemblies 114 employed at locations within the circumference of the brake disk at approximately equally spaced intervals. By using just one (or a few) anti-squeal friction pads 116, in some of the locations, in combination with conventional friction pads 116', at all other locations (as shown in FIG. 1A), the overall symmetry of the brake assembly is disrupted which further reduces acoustic resonant vibrations. One skilled in the art will appreciate that other embodiments may exist in which anti-squeal pads may replace all pads would also be within the scope of the present invention.

As will be realized, the invention is capable of other and different embodiments, and its several details are capable of modifications in various obvious respects, all without departing from the essence of the invention. For instance, the invention may be practiced as an apparatus and/or process, and can be scaled. There is within the scope of the invention, a continuously operated web tension brake comprising a brake disc, a conventional friction pad assembly comprising a friction pad adhered to a first back plate, an anti-squeal friction pad assembly comprising a friction pad, a first back plate adhered to the friction pad, a rubber isolation layer adhered to the first back plate and a second back plate adhered to the rubber isolation layer, and a plurality of pneumatically actuated pistons to frictionally engage the conventional friction pad assembly and the anti-squeal friction pad assembly to the brake disk. There may be a second brake disk and a second plurality of pneumatically actuated pistons to frictionally engage the conventional friction pad assembly and the anti-squeal friction pad assembly to the second brake disk. The rubber isolation layer may be formulated to withstand temperatures that occur during continuous brake application.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A web tension brake assembly which, during operation, always operates with continuous slip so as to reduce resonant vibration of the web tension brake assembly, the web tension brake assembly comprising:
   a pair of brake disks mounted on a common brake shaft and extending parallel to and being spaced apart from one another;
   at least a first pair of anti-squeal friction pad assemblies being located between the pair of brake disks;
   each anti-squeal friction pad assembly, of the first pair of anti-squeal friction pad assemblies, comprising a friction pad, a first back plate adhered to the friction pad, an isolation layer, consisting of silicon rubber, adhered to the first back plate and a second back plate adhered to the silicon rubber isolation layer;
   at least a first pneumatically actuated piston being supported by a support plate and located between both the first pair of anti-squeal friction pad assemblies and the pair of brake disks;
   the first pneumatically actuated piston being configured to force each anti-squeal friction pad assembly, of the first pair of anti-squeal friction pad assemblies, away from one another into frictional engagement with a respective one of the pair of brake disks;
   both of the first and the second back plates having a pair of spaced apart openings for securing the respective anti-squeal friction pad assembly to the support plate by a respective pair of guide studs;
   each respective pair of guide studs being fixed to one opposed side of the support plate and extending therefrom for engagement with a respective one of the pair of openings formed in the first and the second back plates of the respective anti-squeal friction pad assembly, and each respective guide stud extending through the respective first back plate, the respective silicon rubber isolation layer and the respective second back plate of the respective anti-squeal friction pad assembly for securing the respective anti-squeal friction pad assembly to the support late while facilitating movement of the respective anti-squeal friction pad assembly, along the respective pair of guide studs, into frictionally engage with the respective brake disk; and
   the first pair of anti-squeal friction pad assemblies being configured, during continuous braking, to disrupt an overall symmetry and reduce acoustic resonant vibration and production of noise.

2. The web tension brake assembly of claim 1, wherein the silicon rubber isolation layer is formulated so as to withstand temperatures that occur due to the continuous slip.

3. The web tension brake assembly of claim 2, wherein the silicon rubber isolation layer comprises a rubber formulated to withstand temperatures generated by the continuous slip of the web tension brake assembly.

4. The web tension brake assembly of claim 2, wherein the rubber isolation layer comprises one of a thermoplastic layer, leather or a soft metal layer selected from the group consisting of lead, zinc, aluminum, and alloys thereof.

5. The web tension brake assembly of claim 2, wherein the rubber isolation layer is configured to change a natural frequency of vibration of the web tension brake assembly.

6. The web tension brake assembly of claim 1, wherein the web tension brake assembly comprises a second pair of friction pad assemblies located between the pair of brake disks,
at least a second pneumatically actuated piston,
each friction pad assembly, of the second pair of friction pad assemblies, only comprises a friction material adhered to a back plate; and
the second pneumatically actuated piston is configured to force each friction pad assembly, of the second pair of friction pad assemblies, into frictional engagement with a respective one of the pair of brake disks.

7. The web tension brake assembly of claim 6, wherein the rubber isolation layer acts as an isolator so as to make the first pair of anti-squeal friction pad assemblies behave differently from the second pair of friction pad assemblies.

8. An anti-squeal friction pad assembly set which, during operation, always operates with continuous slip so as to reduce resonant vibration of the anti-squeal friction pad assembly set, said pad assembly set comprising:
a pair of brake disks mounted on a common brake shaft and extending parallel to and being spaced apart from one another;
at least a first pair of anti-squeal friction pad assemblies being located between the pair of brake disks and a second pair of friction pad assemblies being located between the pair of brake disks;
a first pneumatically actuated piston being supported by a support plate and being located between the first pair of anti-squeal friction pad assemblies for biasing the first pair of anti-squeal friction pad assemblies away from one another and into engagement with a respective one of the pair of brake disks;
a second pneumatically actuated piston being located between the second pair of friction pad assemblies for biasing the second pair of friction pad assemblies away from one another and into engagement with a respective one of the pair of brake disks;
each of the first pair of anti-squeal friction pad assemblies comprising an anti-squeal friction pad assembly comprising:
a friction pad;
a front surface of a first back plate adhered to a rear surface of the friction pad; and
an isolation layer, consisting of silicone rubber, disposed between said first back plate and a second back plate, said silicone rubber isolation layer being configured to change a natural frequency of vibration of at least one rotating brake disc during engagement of the first pair of anti-squeal friction pad assemblies via the first pneumatically actuated piston;
both of the first and the second back plates having a pair of spaced apart openings for securing the anti-squeal friction pad assembly to the support plate by a pair of respective guide studs;
each respective pair of guide studs being fixed to one opposed side of the support plate and extending therefrom for engagement with a respective one of the pair of openings formed in the first and the second back plates of the respective anti-squeal friction pad assembly, and each respective guide stud extending through the respective first back plate, the respective silicon rubber isolation layer and the respective second back plate of the respective anti-squeal friction pad assembly for securing the respective anti-squeal friction pad assembly to the support plate while facilitating movement of the respective anti-squeal friction pad assembly, along the respective pair of guide studs, into frictionally engage with the respective brake disk;
each of the second pair of friction pad assemblies comprising a friction material adhered to a back plate; and
the first pair of anti-squeal friction pad assemblies being configured, during continuos braking, to disrupt an overall symmetry and reduce acoustic resonant vibration and production of noise.

9. The pad assembly set of claim 8, wherein the silicone rubber isolation layer is formulated to withstand temperatures that occur during continuous brake application.

10. A method for reducing squeal in a web tension brake assembly comprising the steps of:
providing a pair of spaced apart brake disks;
supporting at least a first pair of anti-squeal friction pad assemblies on a support plate located between the pair of brake disks;
forming each friction pad assembly, of the first pair of anti-squeal friction pad assemblies, so as to comprise a friction pad, a first back plate adhered to a rear surface of the friction pad, a front surface of a rubber isolation layer adhered to a rear surface of the first back plate and a front surface of a second back plate adhered to a rear surface of the rubber isolation layer;
supporting at least a second pair of pad assemblies on the support plate located between the pair of brake disks;
forming each friction pad assembly, of the second pair of friction pad assemblies, so as to comprise solely a friction material adhered to a back plate;
supporting a first piston on the support plate between the first pair of anti-squeal friction pad assemblies;
both the first and the second back plates having a pair of openings, located on opposite ends of the rubber isolation layer, for securing the respective anti-squeal friction pad assembly to the support plate by a respective pair of guide studs;
supporting a second piston on the support plate between the second pair of friction pad assemblies;
fixing each respective pair of guide stud to one opposed side of the support plate so as to extend therefrom for engagement with a respective one of the pair of openings formed in the first and the second back plates of the respective anti-squeal friction pad assembly;
extending each respective guide stud through the respective first back plate, the respective silicon rubber isolation layer and the respective second back plate of the respective anti-squeal friction pad assembly to secure the respective anti-squeal friction pad assembly to the support plate and facilitate sliding movement of the respective anti-squeal friction pad assembly, along the respective pair of guide studs, into frictionally engage with the respective brake disk;
pneumatically actuating the first piston so as to force the first pair of anti-squeal friction pad assemblies away from one another and frictionally engage each of the first pair of anti-squeal friction pad assemblies with a respective one of the pair of brake disks and simultaneously pneumatically actuating the second piston so as to frictionally engage each of the second pair of friction pad assemblies assembly with a respective one of the pair of brake disks; and reducing acoustic resonant vibration and noise production by disrupting, via the first pair of anti-squeal friction pad assemblies, an overall symmetry of the web tension brake assembly.

\* \* \* \* \*